Sept. 9, 1930.    T. P. WALLACE    1,775,111
FLOAT ROLL FOR GINS
Filed June 20, 1929
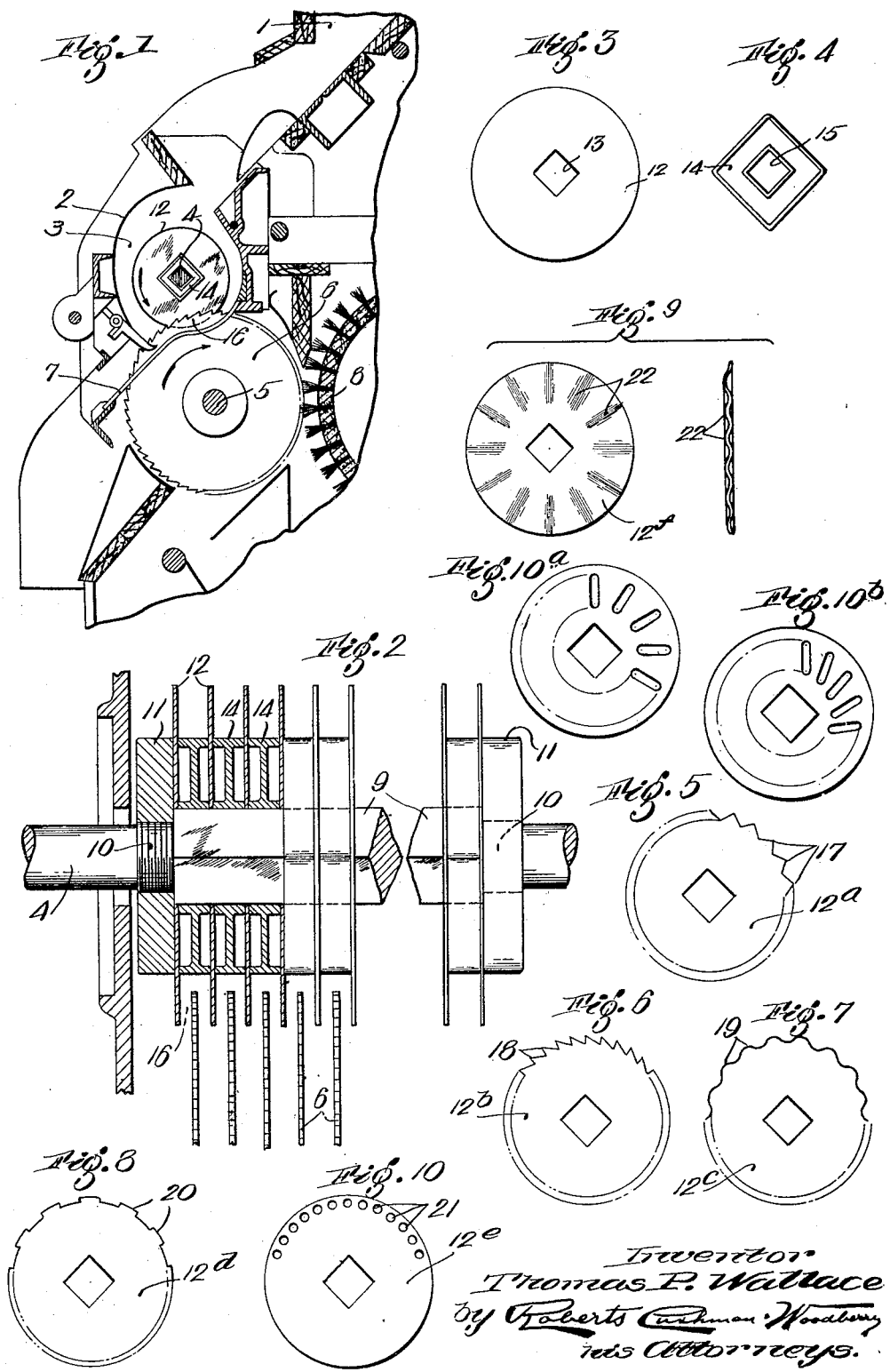

Patented Sept. 9, 1930

1,775,111

UNITED STATES PATENT OFFICE

THOMAS P. WALLACE, OF MEMPHIS, TENNESSEE, ASSIGNOR TO CARVER COTTON GIN COMPANY, OF BRIDGEWATER, MASSACHUSETTS, A CORPORATION OF MASSACHUSETTS

FLOAT ROLL FOR GINS

Application filed June 20, 1929. Serial No. 372,429.

This invention pertains to linter gins and relates more particularly to improvements in the float or impeller roll which forms a usual element of such gins, the function of such float roll being to form a core upon which the fibrous seeds accrete to form a cylindrical roll, and to keep this roll in contact with the grate bars and in operative relation to the saws, and also to keep the fibrous mass in motion, that is, in slow rotation so as continuously to supply fresh material to be acted upon by the saw teeth. In the delinting operation, which follows one or more previous ginning operations in which the long fiber is removed from the seeds, the fiber remaining upon the seeds is so short that it does not mat together very firmly, if at all, so as to form a compact roll in the roll box and for this reason a float roll is provided in the linter gin in order that the mass of seeds may be rotated to present fresh material to the saws. On the other hand, in the ordinary first cut gin the fiber upon the seeds is so long that the mass in the roll box is closely matted and turns as a unit in response to the action of the saw cylinder, and thus the first cut gin does not require any element corresponding to the float roll of a linter gin.

In accordance with the usual practice, the float roll comprises a rotating shaft supporting a plurality of blades, paddles, ribs, or the like, which extend longitudinally and uninterruptedly from one end of the roll to the other. By reason of this longitudinal continuity of these blades, ribs, or the like, it is necessary to space the float roll shaft from the saw shaft so that the saw blades, at the maximum upper position of the saw shaft, will not intersect the path of rotation of the outer edges of the float roll blades or ribs. Thus the nearest possible approach of the float roll to the saw cylinder is that in which the cylindrical surface described by the tips of the saw teeth is tangent to the cylindrical surface described by the edges of the float roll ribs, and as a matter of practice even this condition of tangency is not attainable. When it is remembered that the blades or ribs of the float roll are angularly spaced from one another, it is clear that with the usual spacing of the roll and saw shafts, the roll can not exert any continuous or really effective or uniform pressure to force the material in the roll box into operative contact with the grate bars and saws, and although the interior of the fibrous mass in the roll box may be driven at a definite speed, the peripheral portion thereof, and particularly that part which lies in the space between the approaching blades and saws, is not under definite control of the float roll and tends to lag behind the float roll as the latter rotates.

After extended experiment I have discovered that by a radical departure from accepted constructions I can provide a float roll which is highly effective at all settings of the saw cylinder; which exerts substantially constant and uniform pressure upon the material in the roll box and tends to rotate the outer portion of the mass with as positive an action as the interior; which is effective at a point well within the periphery of the cylindrical surface described by the tips of the saw teeth and in fact, if desired, substantially at the ginning point; and which by reason of such novel mode of operation results in an increase in efficiency as compared with usual constructions of 60% or more.

These improved results I attain by dividing the float roll longitudinally into sections such that a saw blade may enter between each section, and for certainty and efficiency of operation I make each section in a form of a circumferentially continuous impeller plate or disk substantially perpendicular to the float roll shaft and adapted to enter with slight clearance between the blades of the saw cylinder. While I am unable definitely to state the theoretical reason for the improved results thus secured, I attribute it in part at least to the fact that in entering between the saws, the impeller disks of the float roll exert a continuous frictional drag upon the material in the roll box tending to carry it into close proximity to the saw teeth and that as the teeth engage the material, the latter is held under a constant and uniform drag or pressure which enables the saw teeth to engage the fiber with more certainty than when the mass in the roll box is under less restraint. The observed effect is increased to some extent, at least, if instead of using a plain smooth-edged disk, I provide the disk with means tending to increase the friction or other drag upon the fibrous mass. Thus, for example, the disks may be provided with teeth or the like, adapted to secure a firmer grip upon the material, but to prevent cutting or hulling, I find it desirable to keep the disk thin relatively to the width of the space between the saws.

In the accompanying drawings I have illustrated a desirable mode of constructing my improved float roll and have shown disks of various desirable forms for use in making the roll but with the understanding that in its broadest aspects the invention is not necessarily limited to the precise construction or details herein shown by way of example.

In the drawings,

Fig. 1 is a fragmentary vertical section showing my improved float roll, as embodied in a linter gin of well-known type;

Fig. 2 is a fragmentary front elevation, partly in vertical section through the axis of the roll shaft, to larger scale than Fig. 1;

Fig. 3 is a side elevation showing one form of roll shaft disk;

Fig. 4 is a side elevation of a desirable form of spacer for spacing adjacent disks;

Figs. 5, 6, 7 and 8 are views similar to Fig. 3, but showing disks provided with peripheral teeth of various shapes;

Fig. 9 is a composite view showing a disk (in front and edge elevation, respectively) having a smooth edge but being ribbed or corrugated;

Fig. 10 is a side elevation of a disk having a smooth edge but provided with a series of openings adjacent to its edge; and Figs. 10$^a$ and 10$^b$ are views similar to Fig. 10, illustrative of further modifications.

Referring to Fig. 1 I have illustrated a conventional form of gin having the feed hopper 1, the breast structure 2, the roll box 3, the float roll shaft 4 adapted to be mounted in the float roll shaft bearings of a linter gin of commercial type, the saw shaft 5, the saws 6, the grate bars 7, and the brush cylinder 8. In accordance with common practice in linter gins the float roll shaft is driven (by usual means not shown) at a speed substantially less than that of the saw shaft, and in a direction opposite to that of the saw shaft, and as is usual in linter gins, the float roll shaft is spaced substantially midway between the front and rear walls of the roll box to provide space for the roll of fibrous seeds which accretes upon the rigid float roll as about a core. Likewise, the saw cylinder and grate bars may be of usual type, the bars being fixed and extending from the rear wall of the roll box downwardly and forwardly to the seed discharge opening.

In accordance with the present invention I prefer to provide the float roll shaft 4 with a squared central portion 9 (Fig. 2) and with screw-threaded portions 10 at each end of the square portion adapted to receive internally screw-threaded clamping collars 11. Preferably these collars are square or angular for the reception of a wrench. Between the collars 11 I mount a series of impeller disks 12, each having a square central opening 13 for the reception of the squared portion 9 of the shaft, and between adjacent disks interpose suitable spacers 14, the spacers also having square openings 15 for the shaft. Obviously the disks and spacers could be keyed to a shaft of circular section if preferred. These disks and spacers are mounted in proper alternation upon the shaft and clamped together to form a unitary structure by tightening the collars 11. The spacers 14 are of such thickness as to hold the disks 12 spaced apart sufficiently to permit a saw blade 6 to enter between adjacent disks with some clearance, and may be of any desired contour.

As thus constructed it is possible to arrange the float roll shaft 4 at such a distance from the saw shaft 5 as to permit the saw blades to extend up into the spaces between the float roll blades, as indicated at 16, in Figs. 1 and 2 and when so arranged, the cylindrical surface defined by the tips of the saw teeth intersects the cylindrical surface defined by the edges of the float roll disks. When the gin is operated, the disks forming the float roll, by their frictional action upon the fibrous mass in the roll box, tend to rotate the latter, and as the linear speed of the disks is greatest at the circumference, the action upon the fibrous mass is greatest at that point where it is most effective in carrying the fibrous seeds down into operative engagement with the saw teeth. Moreover, since the disk is continuous, the action upon the fibrous mass is uniform and steady, as compared with the more or less intermittent pressure exerted by the spaced blades of the usual float roll.

While the smooth disk 12 of Fig. 3 gives very desirable results, I have found that the action is further improved when the disk is so constructed as to increase the frictional drag exerted upon the material. Thus in Fig. 5 the disk 12$^a$ is provided with peripheral teeth 17, which are of substantially equilateral triangular shape. In Fig. 6 the disk 12$^b$ is provided with teeth 18 which are triangular, but whose advancing edges are preferably substantially radial. In Fig. 7 the disk 12$^c$ is provided with teeth 19 which are rounded or curved. In Fig. 8 the disk 12$^d$ is provided with teeth 20 which are more or less rectangular. In Fig. 9 the disk 12$^f$ has a smooth peripheral edge but is provided with radial ribs 22, while in Fig. 10 the disk 12$^e$ has a smooth edge and smooth surface but has a circumferentially extending series of openings or pockets 21. While in certain of the forms just described the disk has spaced openings or recesses for increasing the frictional grip of the disk on the fibrous material, the disk still has circumferentially continuous portions such that a substantially uniform drag is exerted upon the material, as distinguished from the irregular and intermittent effect produced by spaced independent pins or blades. Obviously other means for increasing the friction or drag exerted by the disk upon the fibrous mass may be employed within the scope of the invention, and disks of different kinds may be assembled to form the float roll if it should be found desirable to do so.

While I have described one desirable mode of building up the float roll by the use of disks and spacers mounted on a squared shaft, I wish it to be understood that the float roll, comprising a series of axially spaced plates, may doubtless be constructed in other ways, and that other means for holding disks in spaced assembled relation, and for driving them may be devised without departing from the spirit of the invention.

I claim:

1. A float roll for use in linter gins, said roll being designed to form a core for the roll of fibrous seed in the roll box of such a gin, and comprising a shaft and a plurality of circumferentially continuous impellers mounted thereon, said impellers being spaced longitudinally of the shaft to admit the saw blades between them and constituting means for urging the fibrous seeds with a substantially uniform frictional pressure into close proximity to the linter gin saws.

2. A float roll for use in linter gins, said roll being designed to form a core for the roll of fibrous material in the roll box of such a gin, and comprising a shaft and a plurality of impeller plates mounted thereon, said plates being spaced longitudinally of the shaft to admit the saw blades between them and constituting means for urging the fibrous seeds with a substantially uniform and continuous frictional drag into close proximity to the linter gin saws.

3. In combination with a linter gin having a roll box, a saw cylinder and grate bars, a float roll comprising circumferentially continuous impeller members, said members describing a cylindrical surface which intersects the cylindrical surface described by the tips of the saw teeth, the axis of the float roll being disposed substantially midway between the front and rear walls of the roll box.

4. A float roll for use in linter gins, said float roll being designed to form a core for the roll of fibrous seed in the roll box of such a gin, and comprising a shaft and a plurality of impeller disks mounted thereon, said disks being spaced longitudinally of the shaft to admit a gin saw between adjacent disks, and exerting a substantially uniform and continuous frictional drag upon the material in the roll box whereby to urge the seed toward the saws.

5. A float roll for use in linter gins, said float roll being designed to form a core for the roll of fibrous seed in the roll box of such a gin, and comprising a rotary shaft and a series of disks fixed to the shaft and spaced to admit a gin saw between adjacent disks, said disks being provided with means adapted to exert a rotational drag upon the material in the roll box of the gin for urging it into close proximity to the saws.

6. A float roll for use in linter gins, said float roll being designed to form a core for the roll of fibrous seed in the roll box of such a gin, and comprising a series of coaxial disks, and means holding the disks in spaced relation to admit a gin saw between adjacent disks, each disk having projecting elements adapted to exert a rotational drag upon the material in the roll box of the gin for continuously presenting fresh portions of the material to the saws.

7. A float roll for use in linter gins, said float being designed to form a core for the roll of fibrous seed in the roll box of such a gin, and comprising a shaft adapted to be mounted in the float roll shaft bearings of a linter gin, said shaft carrying a series of coaxial disks, spacer elements interposed between adjacent disks adapted to space adjacent disks so as to admit the edge of a gin saw between them, and means for clamping the disks and spacers together as a unit, said disks constituting means for urging the fibrous seeds with a substantially uniform and continuous frictional pressure into close proximity to the saws of the linter gin.

8. In combination in a linter gin having a roll box, a saw cylinder, and fixed grate bars extending from the rear wall of the roll box forwardly and downwardly, and a float roll within the roll box comprising a series of disks spaced longitudinally of the roll box to alternate with the saws of the saw cylinder, said disks exerting a substantially uniform and continuous frictional drag upon the material in the roll box for urging it toward the saws.

9. In combination in a linter gin having a roll box, a saw cylinder and a float roll shaft, the saw cylinder and float roll shaft turning in opposite directions, the float roll shaft being spaced substantially midway between the front and rear walls of the roll box and carrying a float roll comprising a series of disks spaced apart to alternate with the saw blades, said disks exerting a substantially uniform and continuous frictional drag upon the material in the roll box for urging it toward the saws.

10. In combination in a linter gin having a roll box and a saw cylinder, a float roll having its axis disposed substantially midway between the front and rear walls of the roll box, the saw cylinder and float roll turning in opposite directions, the float roll comprising a series of circumferentially continuous, axially spaced impeller members adapted to exert a continuous rotational drag upon the material in the roll box to present the material to the saws.

11. That method of presenting fibrous cotton seed which has been deprived of its long fiber in a previous ginning operation to the saws of a linter gin which comprises building up a cylindrical roll of the short fibered seed and causing said roll to rotate in a direction opposite to that of the saws while exerting a continuous substantially uniform pressure upon the peripheral portion of the roll to force the material composing it into engagement with the saws.

12. That method of presenting fibrous cotton seed which has been deprived of its long fibers in a previous ginning operation to the saws of a linter gin which comprises building up a cylindrical roll of the short fibered seed upon a rigid core and exerting a continuous uninterrupted frictional drag upon the mass of material forming the roll, whereby to present the peripheral portion of the mass to the saws with a substantially uniform pressure.

13. A float roll for use in linter gins comprising a shaft adapted to be mounted in the float roll shaft bearings of a linter gin, and a series of peripherally toothed disks mounted in spaced relation upon the shaft and constituting means for urging the fibrous seeds with a substantially uniform and continuous frictional pressure into close proximity to the saws of the linter gin.

14. A float roll for use in linter gins comprising a shaft adapted to be mounted in the float roll shaft bearings of a linter gin, and a series of disks mounted in spaced relation upon the shaft, certain at least of the disks being provided with indentations on their peripheral edges and constituting means for urging the fibrous seeds with a substantially uniform and continuous frictional drag into close proximity to the saws of the linter gin.

15. A float roll for use in linter gins comprising a shaft adapted to be mounted in the float roll shaft bearings of a linter gin, and a series of disks mounted on the shaft in spaced relation and constituting means for urging the fibrous seeds into close proximity to the saws, some at least of said disks having spaced openings therethrough.

16. A float roll for use in linter gins comprising a shaft adapted to be mounted in the float roll shaft bearings of a linter gin, and a series of disks mounted on the shaft in spaced relation and constituting means for urging the fibrous seeds into close proximity to the saws, each disk having a series of spaced elongate openings therethrough disposed intermediate the center and the periphery of the disk.

Signed by me at Memphis, Tennessee, this 10th day of June, 1929.

THOMAS P. WALLACE.